United States Patent [19]
Frisch et al.

[11] 3,836,429
[45] Sept. 17, 1974

[54] MEANS FOR RAPIDLY EXPOSING THE CORE OF A NUCLEAR REACTOR FOR REFUELING

[75] Inventors: Erling Frisch, Pittsburgh; Harry N. Andrews, Export, both of Pa.

[73] Assignee: Westinghouse Electric Corporation, Pittsburgh, Pa.

[22] Filed: July 8, 1970

[21] Appl. No.: 53,207

[52] U.S. Cl........................ 176/29, 176/27, 176/30, 176/33
[51] Int. Cl............................................ G21c 19/20
[58] Field of Search ............................... 176/33–36, 176/38, 87, 27, 28, 29, 30

[56] References Cited
UNITED STATES PATENTS
3,212,979   10/1965   Silverblatt............................ 176/36
3,563,855   2/1971   Marko .................................. 176/38
3,578,564   10/1968   Fletcher................................ 176/38

*Primary Examiner*—Reuben Epstein
*Attorney, Agent, or Firm*—J. R. Campbell

[57] ABSTRACT

The upper structure of a nuclear reactor consisting of the control rod mechanisms, the pressure vessel closure head, the upper internals package, and other associated structure are connected to form an integral unit which may be removed from the reactor vessel in a single lift to expose the fuel assemblies of the reactor core to the open end of the reactor vessel. The closure head is hung from the control rod drive missile shield and the upper internals package is hung from the closure head.

6 Claims, 5 Drawing Figures

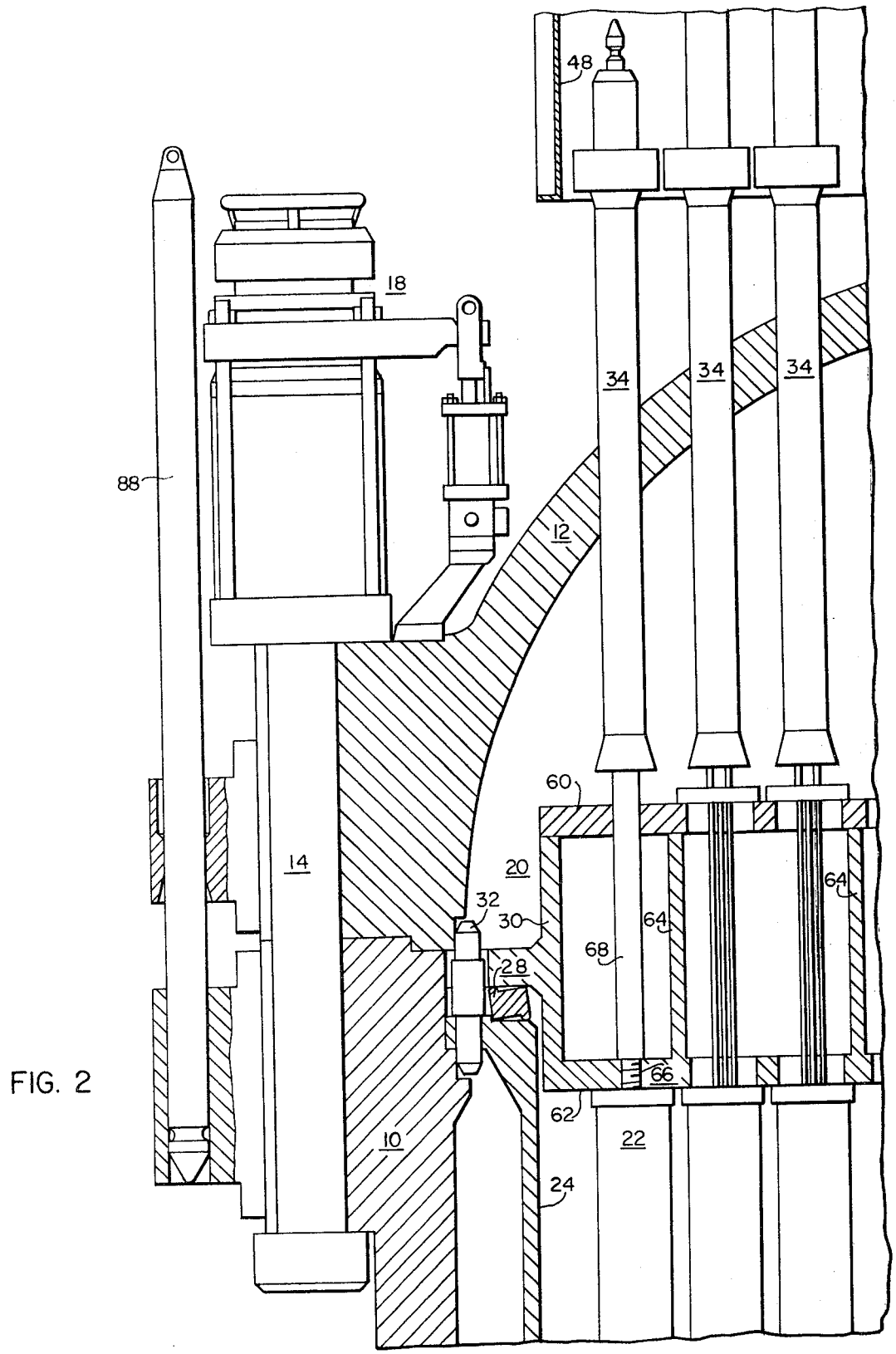

MEANS FOR RAPIDLY EXPOSING THE CORE OF A NUCLEAR REACTOR FOR REFUELING

CROSS REFERENCE TO RELATED APPLICATIONS

This application relates to the following applications concurrently filed herewith, all such applications being assigned to the same assignee as the present invention:

Ser. No. 53,201 entitled "Cable Support Structure For Enabling A Nuclear Reactor To Be Refueled Rapidly" by Erling Frisch and Harry N. Andrews.

Ser. No. 53,201 entitled "Rapidly Refuelable Nuclear Reactor" by Erling Frisch and Harry N. Andrews.

Ser. No. 53,200 entitled "Combination of Nuclear Reactor and Missile Shield" by Erling Frisch and Harry N. Andrews.

Ser. No. 53,200 entitled "Means For Retaining and Handling Reactor O-Ring Seals" by Erling Frisch.

Ser. No. 53,198 entitled "Hydraulic Head Closure Mechanism" by Erling Frisch and Harry N. Andrews.

Ser. No. 53,202 entitled "Rapidly Refuelable Nuclear Reactor" by Harry N. Andrews and Richard S. Orr.

BACKGROUND OF THE INVENTION

This invention pertains to the preparation of a nuclear reactor for refueling, and more particularly to a novel upper structure designed for rapid removal.

The time required for removing the upper structure from a nuclear reactor has made frequent refueling impractical. The electrical lines to the control mechanisms and instrumentation had to be disconnected and stored. Various items had to be removed from and installed on the reactor vessel head. The instrument seals had to be broken. The vessel head's studs had to be untorqued, removed and stored. The vessel head had to be lifted and stored. The guide and drive shafts had to be separately removed and stored, and the deep beam structure, guide tubes and upper core plate had to be removed and stored.

The above tedious procedure had to be reversed when reinstalling the above elements following refueling of the reactor. The time required for the above tasks commonly amounts to a month. Moreover, because of the many operations involved, there was a high probability of a time consuming problem occurring.

SUMMARY OF THE INVENTION

The time required for preparing a nuclear reactor can be greatly reduced, in accordance with this invention, by providing an upper structure which can be installed and removed from the reactor vessel as an integral unit.

A combined lifting device and missile shield is provided surmounting the closure head, and is preferably attached to the reactor closure head by four lifting rods. The lower ends of these lifting rods are secured by threading to brackets welded to the closure head. The upper ends of these rods are provided with cylindrical extensions which penetrate the shield through large clearance holes. Each extension is preferably secured above the missile shield by means of a locking element.

The deep beam structure, guide tubes and upper core plate are supported from the closure head preferably by means of four lifting rods which have their lower ends threaded into the upper support plate. A nut threaded onto an upper portion of these rods rests on a surface of a flange of the penetration adapters which are sealed in and through the closure head. The adapter opening is sealed from the atmosphere by a flanged plug and suitable sealing arrangement.

DESCRIPTION OF THE DRAWING

For a better understanding of the invention, reference may be had to the accompanying drawing, in which:

FIG. 2 shows a similar sectional view taken across a different section from that of FIGS. 1a and 1b and illustrating the attachment of the deep beams support structure to the vessel closure head;

DESCRIPTION OF THE PREFERRED EMBODIMENTS

Figure 1A:
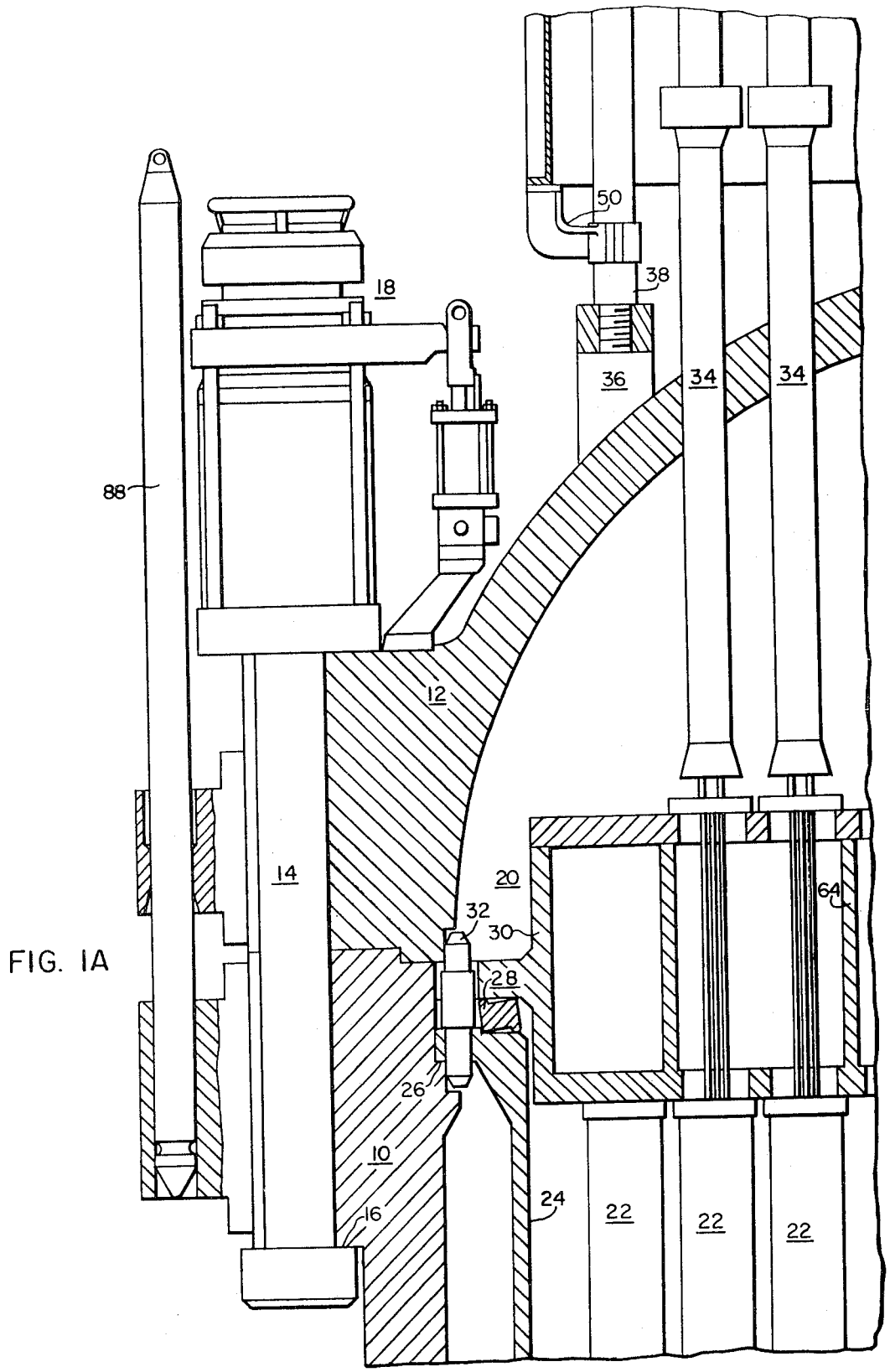
FIGS. 1a and 1b, taken end to end, show a partial sectional view of a nuclear reactor illustrating the attachment of the vessel closure head to the lifting rig.
Figure 1B:
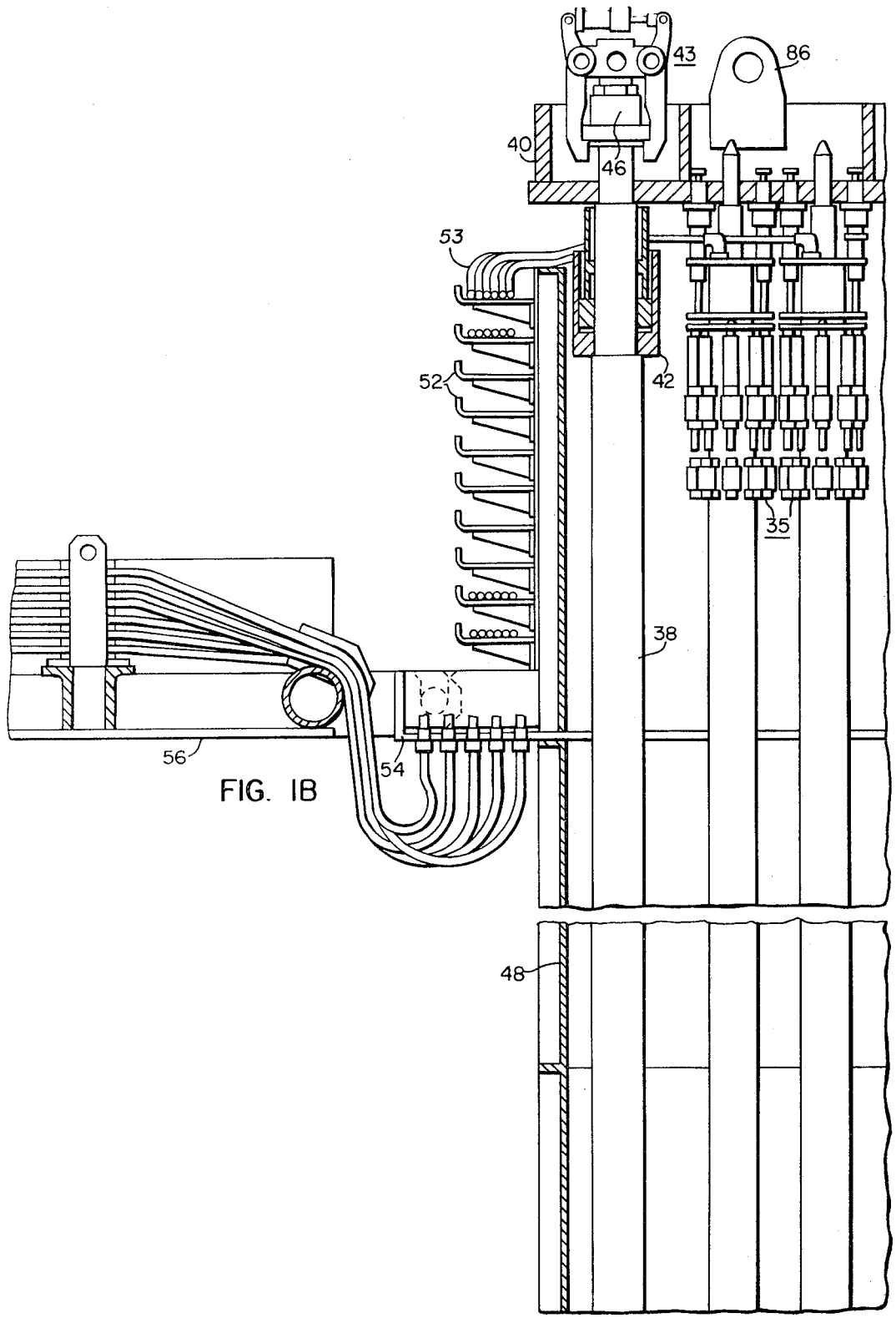

Referring to FIGS. 1a and 1b, there is shown a portion of a nuclear reactor pressure vessel 10, sealed by a closure head 12 which is held in a sealing relationship by a plurality of hydraulically tensioned bolts 14. The bolts may be tensioned or detensioned and tilted into and out of contact with an outwardly extending flange 16 of the vessel 10 by means of an energizing structure 18 which is illustrated and described in said copending application Ser. No. 53,198.

The reactor vessel 10 contains a nuclear core (not shown). As in conventional designs, the nuclear core consists of a plurality of upstanding fuel assemblies which are laterally supported by an upper and lower core plate (not shown). Situated directly above the nuclear core is the upper internal support package which includes the upper core plate.

The upper internal support package also includes columns 22 and a deep-beamed structure 20 which is attached to the upper core plate by the plurality of column-like members 22. Some of the columns 22 serve only to join the deep-beamed structure 20 with the upper core plate, and others of the columns 22 contain various fixtures which serve to guide control members and to align them with guide tubes within the core of the nuclear reactor. The upper internal support package is supported primarily by a core barrel 24 which rests on an inwardly extending flange portion 26 of the vessel 10. An annular Belleville spring 28 is positioned between an outwardly extending flange 30 of the deep-beamed structure 20 and the top of the core barrel 24. A plurality of positioning pins 32 are also provided to properly align the upper internal support package, as will be further explained.

As can be seen in both FIGS. 1a and FIG. 2, a plurality of head penetration adapters 34 are sealed in and extend through the closure head 12 of the nuclear reactor. Mounted on the head penetration adapters are control rod drive mechanisms 35 which move neutron absorbing material into and out of the nuclear core. The particular design of these mechanisms is illustrated and described in copending application Ser. No. 700,121 filed Jan. 24, 1968 by Erling Frisch and Harry N. Andrews and entitled "Drive Mechanisms For Control Elements" and assigned to the assignee of the present invention.

Also mounted on the head closure 12 is a plurality of brackets 36. A plurality of elongated rods 38 extends some distance above the vessel head 12 and threaded into the brackets 36.

A missile shield 40 surmounts the control mechanisms 35 and laterally stabilizes same. The missile shield 40 is affixed to the elongated rods 38. More particularly, each elongated rod 38 has a hydraulic lifting device 42 proximate its end. The missile shield 40 rests on these lifting devices 42 and above the missile shield a hydraulically actuated locking member 43 is situated to securely fix a bolt-like structure 46 which is affixed to the top of the elongated rods 38. This last-mentioned structural arrangement is more particularly illustrated and described in said copending application Ser. No. 53,200.

The control rod drive mechanisms 35 and the elongated rods 38 are substantially contained within an annular housing 48 which is supported on brackets 50 affixed to the elongated rods 38 just above the head brackets 36. The housing 48 has a plurality of outwardly extending electrical wiring support members 52 affixed thereto as well as an electrical plug support platform 54. The support platform 54 and the brackets 50 serve to securely affix the electrical cables to the mechanisms such that when the housing and associated structure is moved, the electrical wiring need not be disconnected therefrom. A cable tray 56 is affixed to the platform which maintains proper alignment of the electrical cables 53. This is more particularly illustrated and described in said copending application Ser. No. 53,202.

Referring now to FIG. 2, it can be seen that the deep-beamed structure 20 is constructed from a top plate 60, a lower plate 62 and a plurality of vertical reinforcement ribs 64. The bottom plate has three or four equally spaced threaded holes 66 near its outer periphery. These holes 66 threadedly receive one end of an elongated rod 68 which extends above closure head 12 through penetration adapters 34.

Figures 3, 4:
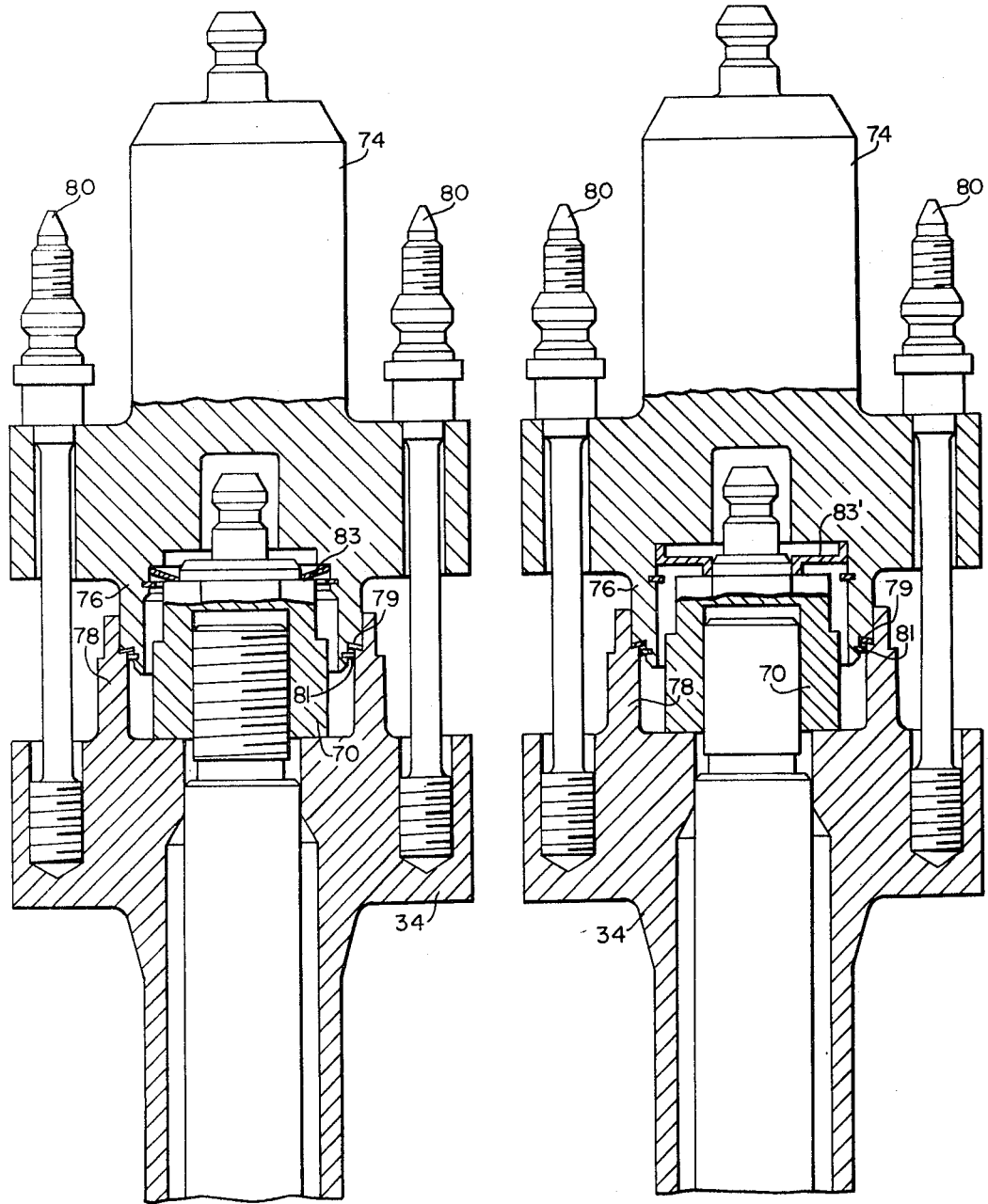
FIG. 3 shows an expanded sectional view of an upper portion of the attachment device of FIG. 2.
FIG. 4 shows a modification of the element of FIG. 3.

The upper ends of the rods 68 are supported on the top of the penetration adapters 34. More particularly, it can be seen in FIGS. 3 and 4 that a nut 70 is affixed near an extremity of each rod 68 and is supported on the top of the penetration adapters 34. This arrangement is sealed from the atmosphere by means of a closure plug 74. The plug 74 has downwardly extending flange portions 76 which mate with upwardly extending flange portions 78 on the penetration adapters 34. A conical ring 79 with its retaining ring 81 may be used to effectively provide the sealing required. The sealing arrangement may be retained in its sealing configuration by means of a plurality of bolts 80 which are screwed into the penetration adapters 34. The nut 70 may be prohibited from loosening either by means of a washer 83 (FIG. 3) or a Belleville spring 83' (FIG. 4).

In order to then remove the upper part of the nuclear reactor which consists of the control rod mechanisms 35, the pressure vessel closure head 12 and members attached thereto, and the upper internal package (which includes the deep-beamed structure 20 and support columns 22 and the upper core plate (not shown)), it is only necessary to attach a lifting carne cable to a lifting fixture 86 affixed to the missile shield 40. More particularly, the bolts 14 are first detensioned and then rotated away from the lower flange 16 by means of the energizing structure 18. The crane operating the cable is then activated and as it moves the missile shield 40 vertically away from the nuclear vessel 10 the closure head 12 and attached members are lifted inasmuch as they are attached to the missile shield 40 by means of the elongated rods 38. The upper internals package is simultaneously lifted inasmuch as it is connected by means of rods 68 to the closure head 12 through the penetration adapters 34 upon which it is supported. It should accordingly be clear that a substantial savings in time and expense can be realized by virtue of the essentially unitary design of the upper structure as disclosed.

If it should be desired to remove the upper structure which comprises the closure head, control rod mechanisms and attached members without removing the upper internals package, it is only necessary to remove the seal plugs 74 and the nuts 70 which are exposed by the previous operation. When the missile shield 40 is then lifted, the closure head, mechanisms and members are separated from the reactor but the upper internals package will remain within the reactor vessel 10.

When the upper internals package is replaced in the reactor vessel at the end of refueling operations, it must be carefully guided in position for about the last 10 feet. For this purpose, three guide studs 88 are removably attached to the pressure vessel flanges outwardly of the bolts 14. The guiding action provided by the guide studs 88 in cooperation with the guiding action provided by the positioning pins 32 supported on the core barrel 24 assure proper alignment of the upper structure including all removed structural and operating components with the nuclear core when the upper structure is replaced after refueling. When this is completed, the energizing means 18 may again rotate the bolts 14 into position and place proper tensioning on same.

What we claim is:
1. A nuclear reactor comprising, in combination:
a pressure vessel sealed by a closure head, said vessel containing an upper structure consisting of said closure head, and members attached thereto, control rod mechanisms, and an upper internal support package;
removable means on said head for separating said head from the pressure vessel;
a plurality of control rods arranged for translational movement with respect to a nuclear core and a plurality of drive mechanisms connected to said control rods and situated exterior to said reactor vessel and on said closure head;
a missile shield mounted outwardly of said control mechanisms;
a first plurality of elongated rods supporting said missile shield at one end and affixed at their other ends to the closure head;
a plurality of penetration adapters sealed in and extending through the closure head;

a second plurality of elongated rods supported at one end by said penetration adapters and affixed at the other end to said upper structure whereby said upper structure is tied to said closure head to expose said nuclear core upon removal of said missile shield and its attached closure head from said vessel.

2. The nuclear reactor of claim 1 wherein said drive mechanisms are laterally supported by the missile shield.

3. The nuclear reactor of claim 2 including a removable nut affixed to an extremity of each said second plurality of elongated rods, said nut being supported by the penetration adapter whereby upon removal of said nuts, said upper structure is disconnected from the adapters.

4. The nuclear reactor of claim 3 including a sealing means surrounding the nut and removably affixed in a sealing relationship with said penetration adapter.

5. The nuclear reactor of claim 3 including an enclosure surrounding the drive mechanisms, said enclosure being supported by said first plurality of elongated rods.

6. The nuclear reactor of claim 1 wherein said first plurality of elongated rods includes actuation means attached to an end thereof for selectively disconnecting said rods from the missile shield.

* * * * *